Patented Oct. 20, 1953

2,656,350

UNITED STATES PATENT OFFICE 2,656,350

SERIES OF NITROFURAN COMPOUNDS COMPRISING SUBSTITUTED 5-NITRO-2-FURALDEHYDE SEMICARBAZONES

William C. Ward, Norwich, and Gabriel Gever, Oxford, N. Y., assignors to Eaton Laboratories, Inc., Norwich, N. Y., a corporation of New York No Drawing. Application May 29, 1950, Serial No. 165,112

4 Claims. (Cl. 260—240)

This invention relates to a new series of substituted nitrofurfural semicarbazones having chemotherapeutic properties. We have discovered that when certain groups are substituted for hydrogen on the terminal nitrogen of the semicarbazone side chain, the resulting compounds are less toxic than the corresponding semicarbazones having an —NH₂ group in the terminal or 4 position of the semicarbazone side chain.

This series is referred to by the following generic name, substituted 5-nitro-2-furaldehyde semicarbazones.

They are represented by the following general formula—

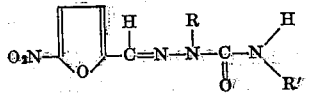

in which

R=hydrogen, lower alkyl, lower aralkyl, aryl and lower hydroxy alkyl

R'=lower aralkyl, aryl and lower hydroxy alkyl.

In order that the invention may be entirely available to those skilled in the art, methods for making a number of the new compounds of the series are described briefly:

EXAMPLE 1

*Preparation of 5-nitro-2-furaldehyde 4-phenylsemicarbazone*

Aniline (50 gm.) is heated to boiling and 10 gm. of acetone semicarbazone added in portions over a short time period. When addition is completed, the solution is heated for ten minutes at gentle boiling. It is then cooled and 50 cc. of ethanol added. This solution is poured with good stirring into 500 cc. of 10% acetic acid. A product consisting of acetone phenyl carbamic acid hydrazone and s-diphenylurea separates. This is filtered and the solids treated with 100 cc. of dilute HCl (15 cc. conc. HCl: 85 cc. water) and boiled for 10–15 minutes. The insoluble carbanilide is filtered and the filtrate concentrated to yield 4-phenylsemicarbazide hydrochloride (M. P. 212–213° C.).

To 7 grams of 4-phenylsemicarbazide hydrochloride dissolved in 100 cc. of water is added dropwise with stirring 5 grams of 5-nitro-2-furaldehyde dissolved in 25 cc. of ethanol. The solution is stirred for 15 minutes after the addition of the aldehyde is completed and the yellow solid which has separated is filtered.

Yield=9 grams (90%)
M. P.=194–197° C.

Analysis:

|   | Calc. | Fd. |
|---|---|---|
| C | 52.52 | 52.36 |
| H | 3.65 | 3.68 |
| N | 20.44 | 20.23 |

EXAMPLE 2

*5-Nitro-2-furaldehyde 4-(2-hydroxyethyl) semicarbazone*

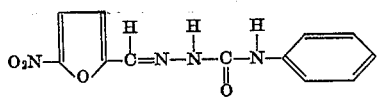

Pure ethanolamine (1000 cc.) is heated to 154° C. in an open vessel. Acetophenone semicarbazone (500 grams) is added, with stirring, in portions during one-half hour at a temperature of 150–160° C. Ten minutes after the addition is complete and ammonia evolution has ceased the mixture is cooled to 75° C. and then it is diluted with three liters of cold water. After stirring at about 15° C. for one-half hour the precipitate of acetophenone 4-(2-hydroxyethyl) semicarbazone is filtered and washed by slurrying with two liters of cold water.

The white crystals thus obtained are suspended in a mixture of four liters of water containing 360 grams of concentrated sulfuric acid. Upon heating to 60–65° C. the acetophenone is split off and forms an oily layer. The ketone is removed and the aqueous solution is extracted twice with ether to remove the last traces.

The aqueous solution of 4-(2-hydroxyethyl) semicarbazide sulfate is diluted with 2500 cc. of water, 1600 cc. of ethanol, 460 grams of concentrated sulfuric acid and treated with 528 grams of 5-nitro-2-furaldehyde diacetate. The mixture is heated under reflux to 70° C. for one hour. Yellow crystals precipitate during this heating period. The mixture is then cooled to 10° C. and the product is filtered. After washing with water and ethanol the product is air-dried. Yield 416 grams, 79% based on the aldehyde diacetate. Melting point 195–198° C.

The crude 5-nitro-2-furaldehyde 4-(2-hydroxyethyl) semicarbazone may be purified by recrystallization from ethanol. The melting point when pure is 202–204° C.

$E_{1\%}^{1\,cm.}$ in water at 3800 Å is 667.

EXAMPLE 3

Preparation of 5-nitro-2-furaldehyde 2-(2-hydroxyethyl)-4-methylsemicarbazone

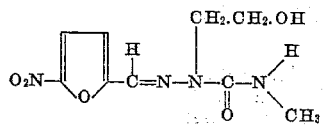

Three and nine-tenths grams of 2-hydroxyethyl-hydrazine (Gabriel, Ber. 47, 3032, (1914)) was dissolved in a mixture of 10 cc. of absolute alcohol and 10 cc. of absolute ether and cooled to 5°. A solution of 2.9 gm. of methyl isocyanate in 10 cc. of absolute ether was added dropwise with stirring. A white solid separated immediately. This when filtered and washed with ether gave 4.3 gm. of 2-(2-hydroxyethyl)-4-methyl semicarbazide, M. P. 95–98°.

Four grams of the latter were dissolved in 70 cc. of 50% alcohol and to the solution was added a solution of 4.2 grams of 5-nitro-2-furaldehyde in 10 cc. of alcohol. The resulting precipitate of 5-nitro-2-furaldehyde 2-(2-hydroxyethyl)-4-methylsemicarbazone weighed 6.6 gm., M. P. 223° with decomposition.

EXAMPLE 4

Preparation of 5-nitro-2-furaldehyde 2,4-dimethylsemicarbazone

A solution of 5.3 grams of 2,4 dimethylsemicarbazide (Vogelsang, Rec. Trav. Chim. 62, 5 (1943)) in 100 cc. of water was stirred with a solution of 7.4 grams of 5-nitro-2-furaldehyde in 20 cc. of alcohol. After warming on the steam bath for a few minutes the solution was cooled. The resulting precipitate was filtered and recrystallized from alcohol, giving 5.2 grams of 5-nitro-2-furaldehyde 2,4-dimethylsemicarbazone, M. P. 168–169° with decomposition.

EXAMPLE 5

Preparation of 5-nitro-2-furaldehyde 4-(3-hydroxybutyl) semicarbazone

Six grams of acetophenone semicarbazone were added in small portions, with stirring, to 25 cc. of 4-amino-2-butanol at 155°. The solution was kept at 150–160° for five minutes, cooled to 50° and then poured into 75 cc. of ice-water. The resulting precipitate of acetophenone 4-(3-hydroxybutyl) semicarbazone, after recrystallization from 50% alcohol, weighed 6.9 gms. M. P. 133°.

The 6.9 grams of acetophenone 4-(3-hydroxybutyl) semicarbazone were heated to boiling with 7 cc. of concentrated hydrochloric acid in 45 cc. of water, cooled and extracted with ether. The aqueous portion was stirred with a solution of 4 gms. of 5-nitro-2-furaldehyde in 10 cc. of alcohol. The yellow precipitate which formed was filtered off and recrystallized from alcohol, giving 5.5 gms. of 5-nitro-2-furaldehyde 4-(3-hydroxybutyl) semicarbazone, M. P. 184° with decomposition.

What is claimed is:

1. A new chemical compound having chemotherapeutic activity and represented by the formula:

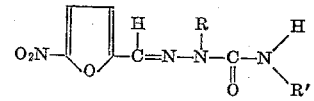

in which

R=hydrogen, lower alkyl, lower aralkyl, aryl and lower hydroxy alkyl

R′=lower aralkyl, aryl and lower hydroxy alkyl.

2. 5-nitro-2-furaldehyde 4-phenylsemicarbazone represented by the formula:

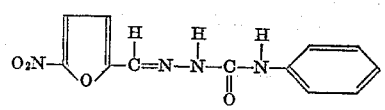

3. 5-nitro-2-furaldehyde 4-(2-hydroxyethyl)-semicarbazone represented by the formula:

4. 5-nitro-2-furaldehyde 4-(3-hydroxybutyl)-semicarbazone.

WILLIAM C. WARD.
GABRIEL GEVER.

References Cited in the file of this patent

UNITED STATES PATENTS

| Number | Name | Date |
|---|---|---|
| 2,416,234 | Stillman | Feb. 18, 1947 |
| 2,416,236 | Stillman | Feb. 18, 1947 |